(12) United States Patent
Kurata et al.

(10) Patent No.: US 11,205,889 B2
(45) Date of Patent: Dec. 21, 2021

(54) ELECTRIC JUNCTION BOX

(71) Applicant: Yazaki Corporation, Tokyo (JP)

(72) Inventors: Sho Kurata, Makinohara (JP); Hideki Kawamura, Makinohara (JP); Minoru Umezaki, Makinohara (JP); Kenta Kamiya, Makinohara (JP); Junya Masuda, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 17/061,908

(22) Filed: Oct. 2, 2020

(65) Prior Publication Data

US 2021/0104880 A1 Apr. 8, 2021

(30) Foreign Application Priority Data

Oct. 4, 2019 (JP) .............................. JP2019-183613

(51) Int. Cl.
*H02G 3/08* (2006.01)

(52) U.S. Cl.
CPC ............. *H02G 3/088* (2013.01); *H02G 3/081* (2013.01)

(58) Field of Classification Search
CPC .......... H02G 3/08; H02G 3/081; H02G 3/088; H02G 3/14; H02G 3/083; H02G 3/16; H05K 5/00; H05K 5/0004; H05K 5/0091; H05K 5/0217; H05K 5/0204; B60R 16/02; B60R 16/0239; H01R 9/2458; H01R 9/24; H01R 2201/26

USPC .......... 174/50, 520, 17 R, 535; 220/3.2–3.9, 220/4.02; 439/76.1, 76.2, 949; 361/600, 361/601, 622, 641, 837, 605
See application file for complete search history.

(56) References Cited

U.S. PATENT DOCUMENTS

| 8,878,059 | B2 * | 11/2014 | Makino | H05K 5/063 |
| | | | | 174/50 |
| 8,969,723 | B2 * | 3/2015 | Hirasawa | H02G 3/088 |
| | | | | 174/50 |
| 9,819,169 | B2 * | 11/2017 | Shiraki | H02G 3/088 |
| 10,312,675 | B2 * | 6/2019 | Kakimi | H02G 3/088 |
| 11,031,761 | B2 * | 6/2021 | Kurata | B60R 16/0238 |
| 11,056,866 | B2 * | 7/2021 | Kakimi | B60R 16/0215 |

FOREIGN PATENT DOCUMENTS

| JP | 2015-056994 A | 3/2015 |
| JP | 2017-127078 A | 7/2017 |

* cited by examiner

*Primary Examiner* — Angel R Estrada
(74) *Attorney, Agent, or Firm* — Banner & Witcoff, Ltd.

(57) ABSTRACT

An electric junction box includes a fitting component to which an electronic component and an electric wire electrically connected to the electronic component are assembled, and a housing in which the fitting component is fitted and held. The fitting component includes a first peripheral wall forming an outer side face of the fitting component, a first bottom wall covering a lower opening of the first peripheral wall, a first drain hole provided in the first bottom wall, and a cylindrical drain portion protruding downward from an edge portion of the first drain hole in the first bottom wall.

4 Claims, 7 Drawing Sheets

ELECTRIC JUNCTION BOX

CROSS REFERENCE TO RELATED APPLICATIONS

This application claims priority from Japanese Patent Application No. 2019-183613 filed on Oct. 4, 2019, the entire contents of which are incorporated herein by reference.

BACKGROUND OF THE INVENTION

Field of the Invention

The present invention relates to an electric junction box such as a fuse box or a junction box.

Description of Related Art

An in-vehicle electric junction box, in which an electronic component such as a fuse or a relay is detachably mounted on a face thereof, is known (see Patent Literature 1: JP-A-2017-127078 and Patent Literature 2: JP-A-2015-56994). This type of electric junction box includes one in which a connector (fitting component), in which an electronic component and an electric wire are assembled, is placed on an electronic component accommodating chamber of a housing in a stack manner. It is conceivable to provide the connector with a bottom wall in order to protect the electric wire assembled to the connector. However, when the bottom wall is provided, there is a concern that water accumulates on the bottom wall. Therefore, it is conceivable to provide a drain hole in the bottom wall, but simply providing the drain hole causes a problem of entering of water from the drain hole during high pressure washing or the like.
[Patent Literature 1] JP-A-2017-127078
[Patent Literature 2] JP-A-2015-56994

SUMMARY

According to one or more embodiments, an electric junction box includes a fitting component to which an electronic component and an electric wire electrically connected to the electronic component are assembled, and a housing in which the fitting component is fitted and held. The fitting component includes a first peripheral wall forming an outer side face of the fitting component, a first bottom wall covering a lower opening of the first peripheral wall, a first drain hole provided in the first bottom wall, and a cylindrical drain portion protruding downward from an edge portion of the first drain hole in the first bottom wall. The housing includes a second peripheral wall forming an outer side face of the housing, a surrounding wall provided to protrude to an outer side of the second peripheral wall, inserted with the drain portion, and surrounding the drain portion, a second bottom wall covering a lower side of the surrounding wall, and a second drain hole provided in the second bottom wall.

DETAILED DESCRIPTION

A specific embodiment according to the present invention will be described with reference to the drawings.

An electric junction box 1 according to the present embodiment is to be mounted on, for example, a vehicle, and is to be interposed between a power source (secondary battery) and an electronic device of a vehicle (not shown) to adjust electric power supplied from the power source to the electronic device. The electric junction box 1 may also be referred to as a relay box, a fuse box, a junction box, or the like.

Figure 1:
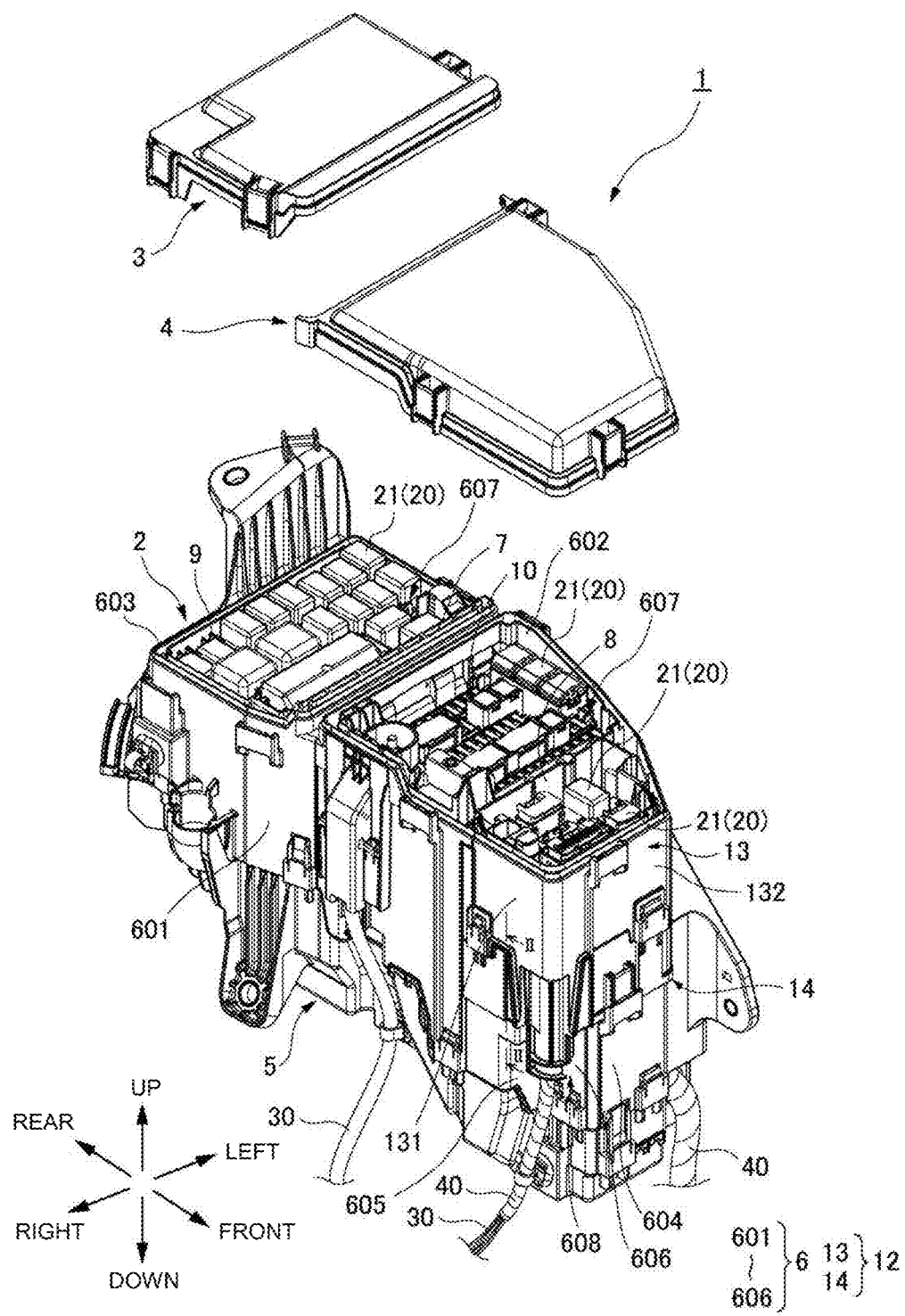
FIG. 1 is an exploded perspective view of an electric junction box according to the present embodiment, with an upper cover thereof removed.

As shown in FIG. 1, the electric junction box 1 according to the present embodiment accommodates electronic components 20 and electric wires 30 connected to the electronic components 20. The electric junction box 1 is to be disposed in an engine room provided on a front side of a vehicle. The electronic component 20 refers to a relay, a fuse, a fusible link, or the like. The electronic component 20 includes an electronic component body (not shown) such as a relay body or a fuse body disposed inside a housing 21, and a plurality of terminals (not shown) serving as electric connection portions which are electrically connected to the electronic component body. The electric wires 30 are electrically connected to the terminals of the electronic components 20.

For the electric wire 30 electrically connected to the terminal of the electronic component 20, one end portion thereof is electrically connected to the terminal of the electronic component 20 and the other end thereof is electrically connected the power source (secondary battery) or the electronic device. The electric wire 30 is electrically connected to the terminal of the electronic component 20 via a mating terminal (not shown). A plurality of the electric wires 30 drawn out from the electric junction box 1 are bundled together by an exterior material 40 such as an adhesive tape or a corrugated tube.

Figure 2:
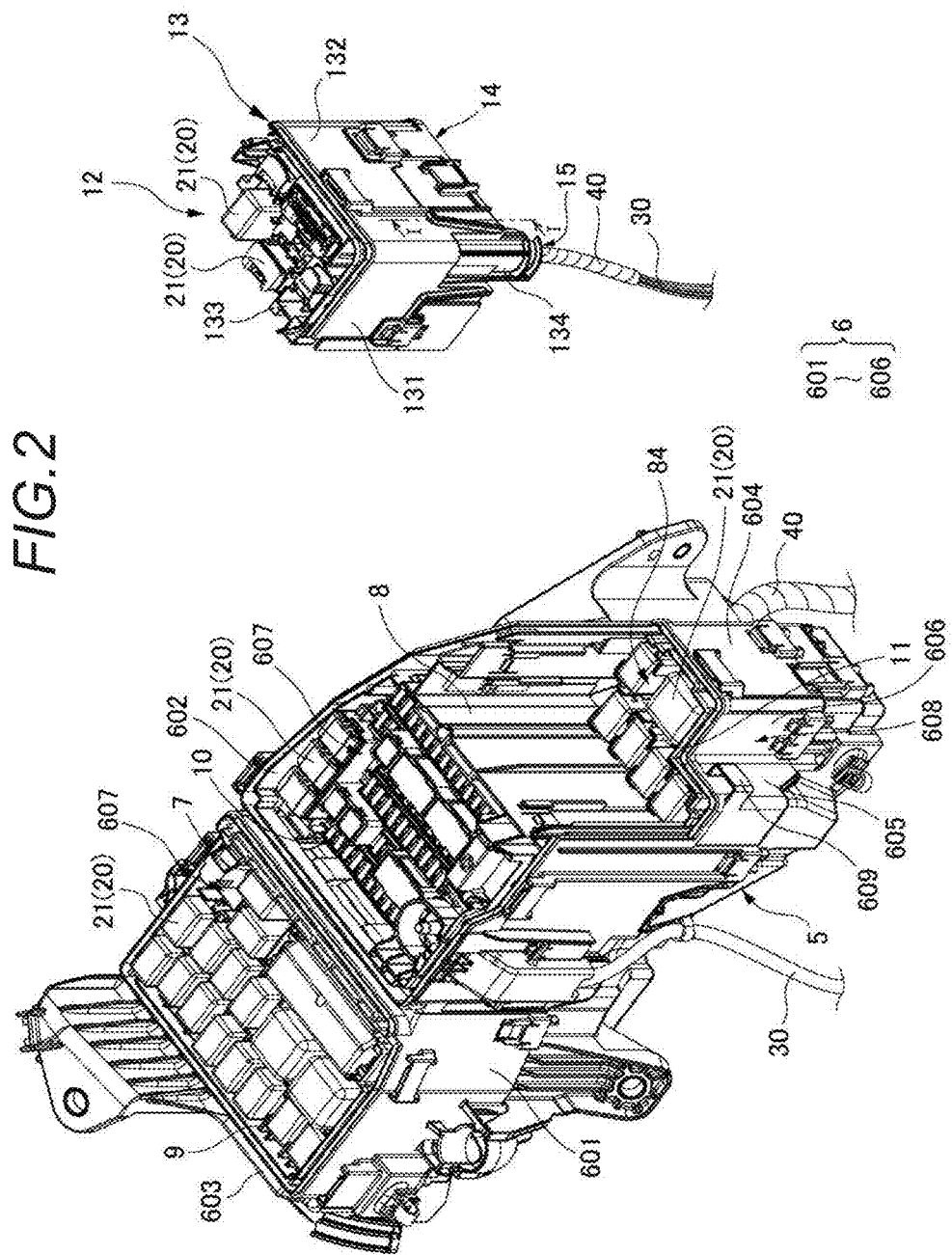
FIG. 2 is an exploded perspective view of the electric junction box shown in FIG. 1 with a fitting component thereof removed.

As shown in FIG. 1, the electric junction box 1 includes a housing 2, a first upper cover 3, a second upper cover 4, and a lower cover 5. The housing 2 includes a housing body 6, partition walls 7, 8 for partitioning the inside of the housing body 6, a plurality of blocks 9 to 11 (the block 11 is shown in FIG. 2) accommodated in the housing body 6, and a fitting component 12 to be fitted to and held by the housing body 6.

The housing body 6 has an opening 607 formed in a substantially rectangular prismatic shape. The opening 607 on one side in a cylindrical length direction is closed by the first upper cover 3 and the second upper cover 4, and an opening (not shown) on the other side is closed by the lower cover 5. The cylindrical length direction is arranged along an up-down direction of the vehicle such that the opening 607 closed by the first upper cover 3 and the second upper cover 4 is directed upward and the opening closed by the lower cover 5 is directed downward in the housing body 6. In addition, the housing body 6 is disposed in a manner that a longitudinal direction of the substantially rectangular opening 607 is along a front-rear direction of the vehicle and a lateral direction thereof is along a left-right direction of the vehicle.

The housing body 6 includes peripheral walls (second peripheral walls) 601 to 606 forming an outer side face of the housing 2. The peripheral walls 601, 602 are provided along the front-rear direction, and the peripheral walls 603, 604 are provided along the left-right direction. The housing body 6 is formed into a substantially rectangular cylindrical shape by connecting the peripheral wall 603 between rear ends of the peripheral walls 601, 602 and connecting the peripheral wall 604 between front ends of the peripheral walls 601, 602. In addition, a recess portion 608 recessed inward is provided at a corner portion on a right-front side of the housing body 6. The peripheral walls 605, 606 form the recess portion 608. The peripheral wall 605 is provided extending from a front end to a left side of the peripheral wall 601, and the peripheral wall 606 is provided extending from a left end to a front side of the peripheral wall 604. A left end of the peripheral wall 605 is continuous with a rear end of the peripheral wall 606.

The partition wall 7 is provided in the housing body 6 in a direction perpendicular to the front-rear direction, and two ends thereof in the left-right direction are connected to the peripheral walls 601, 602 of the housing body 6. That is, the partition wall 7 partitions the housing body 6 into two areas arranged in the front-rear direction. In the present embodiment, in the two areas, a front area in the front-rear direction serves as a user maintenance area, and a rear area in the front-rear direction serves as a dealer maintenance area. The user maintenance area accommodates electronic components 20 to be maintained by a user. The dealer maintenance area accommodates electronic components 20 to be maintained by a dealer. The opening 607 above the dealer maintenance area is covered by the first upper cover 3, and the opening 607 above the user maintenance area is covered by the second upper cover 4.

The partition wall 8 is provided in the above user maintenance area of the housing body 6 in a direction perpendicular to the front-rear direction, and two sides thereof in the left-right direction are connected to the peripheral walls 601, 602. That is, the partition wall 8 partitions the user maintenance area into two areas arranged in the front-rear direction. From a side of the peripheral wall 601 frontward of the partition wall 8 to a left end portion of the peripheral wall 604, one notch 84 having a notched upper end is provided.

The blocks 9 to 11 are each provided with an accommodating chamber for accommodating and holding a plurality of electronic components 20. The blocks 9 to 11 each accommodate and hold the electronic component 20 such that the housing 21 of the electronic component 20 is directed upward, and the terminal portion thereof is directed downward. In the present embodiment, the blocks 9 to 11 are disposed in the dealer maintenance area rearward of the partition wall 7, an area in the user maintenance area rearward of the partition wall 8, and an area in the user maintenance area frontward of the partition wall 8, respectively.

In the present embodiment, the block 9 in the dealer maintenance area is fixed integrally with the housing body 6. The blocks 10, 11 in the user maintenance area are detachably attached to the housing body 6. As shown in FIG. 2, the block 11 disposed in the area frontward of the partition wall 8 is disposed below the above notch 84. More specifically, the block 11 is accommodated in a space surrounded by the partition wall 8, the peripheral walls 601, 602 frontward of the partition wall 8, and the peripheral walls 604 to 606.

Next, the fitting component 12 will be described. As shown in FIG. 2, the fitting component 12 is attached with the electronic components 20 and the electric wires 30 electrically connected to the electronic components 20. The fitting component 12 is accommodated in an area surrounded, from the notch 84 provided in the housing body 6, by the partition wall 8, the peripheral wall 601, and the peripheral wall 602, and is fitted in and held by the housing body 6. The fitting component 12 is disposed above the block 11 disposed in the area frontward of the partition wall 8.

Figure 3:
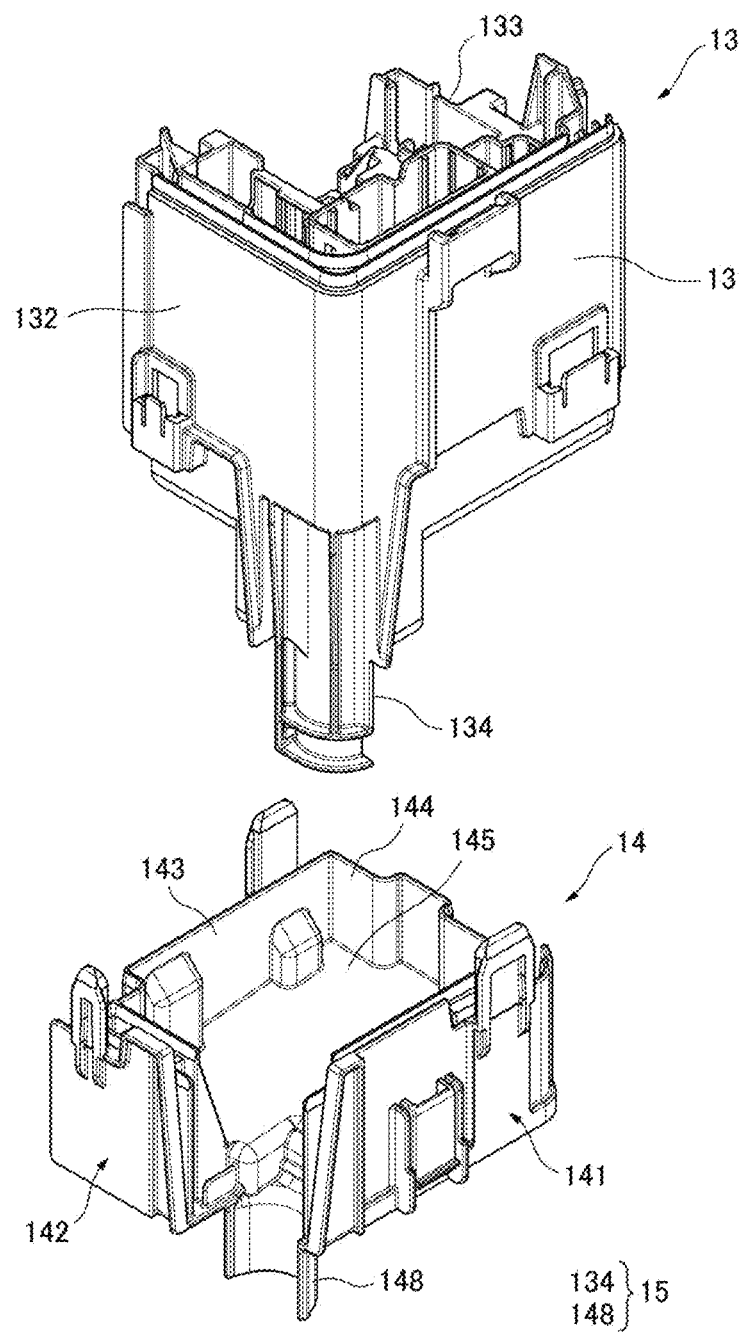
FIG. 3 is an exploded perspective view of the fitting component constituting the electric junction box shown in FIG. 1.

As shown in FIG. 3, the fitting component 12 includes a connector block 13 and a cover 14 for covering a lower side of the connector block 13. When being brought close to each other in the up-down direction, the connector block 13 and the cover 14 are locked to each other and the cover 14 is attached to the lower side of the connector block 13.

Figure 4:
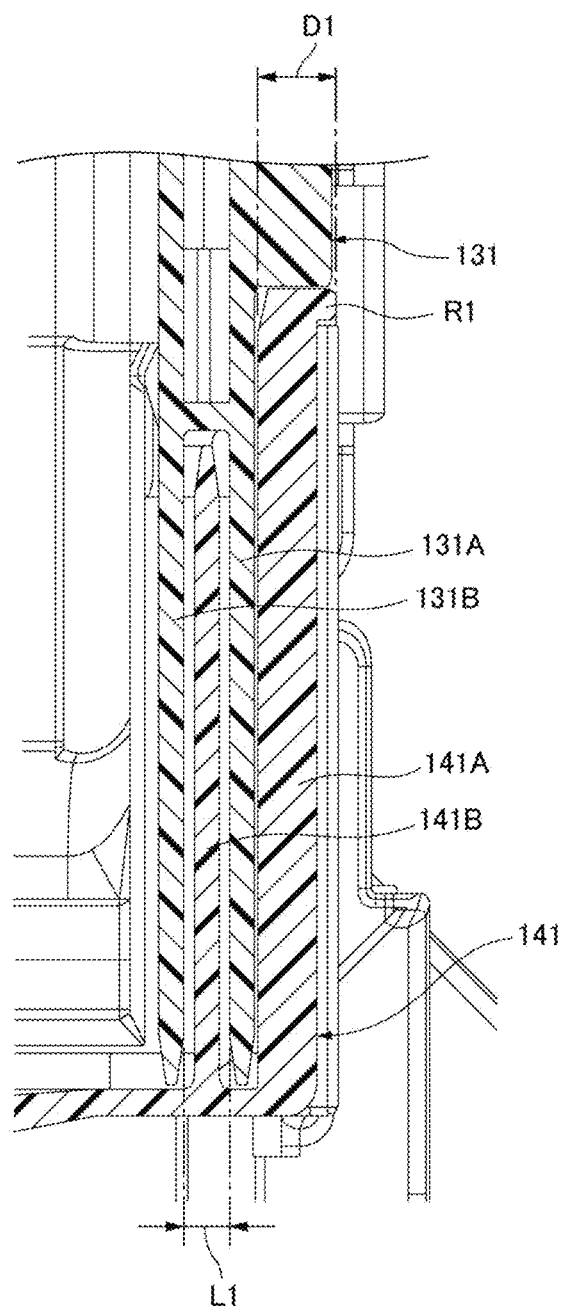
FIG. 4 is a partial cross-sectional view taken along a line I-I in FIG. 2.
Figure 5:
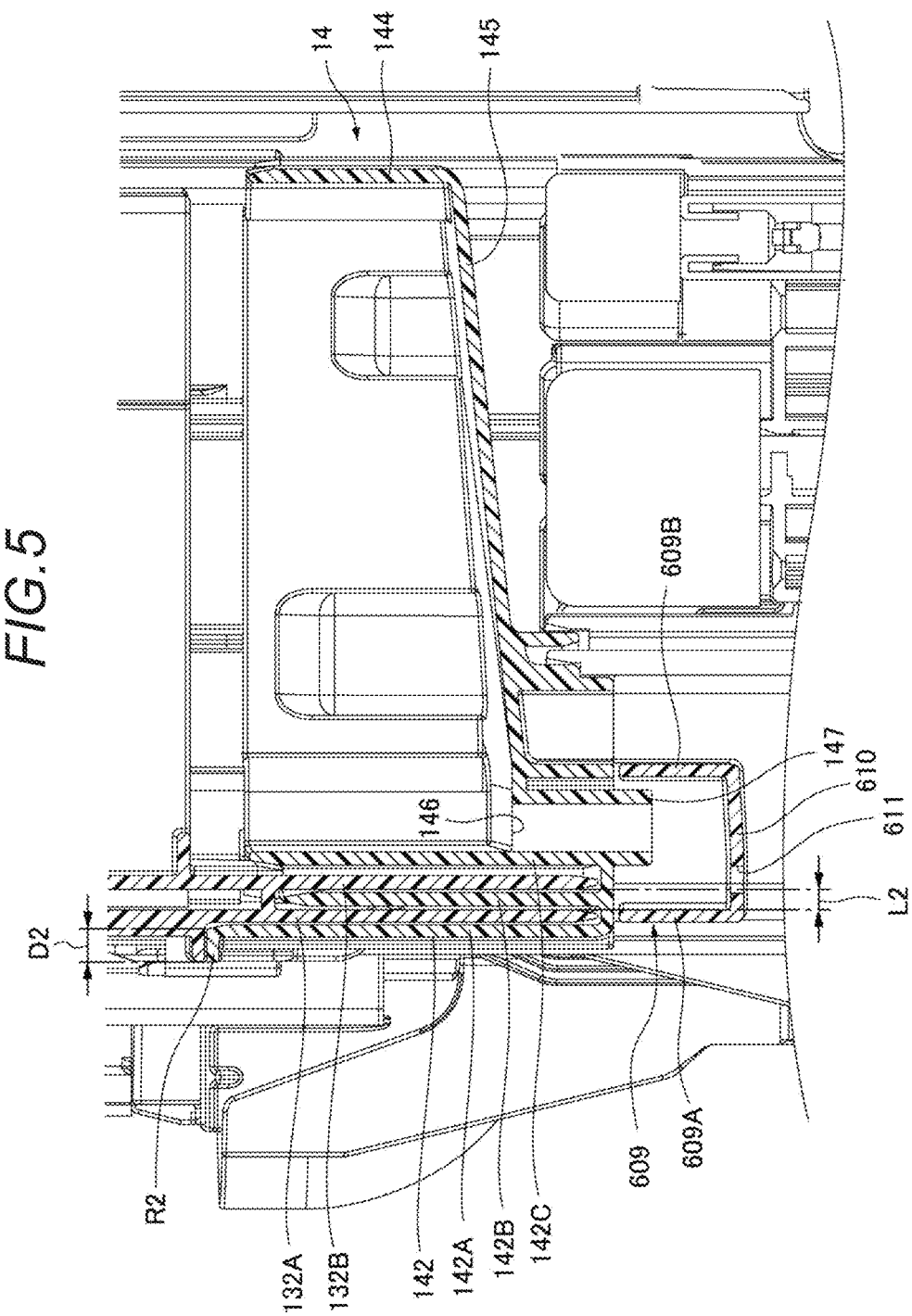
FIG. 5 is a partial cross-sectional view taken along a line II-II in FIG. 1.

The connector block 13 includes peripheral walls 131, 132 (first peripheral wall) forming an outer side face continuous with the peripheral walls 601, 602 of the housing body 6, a block 133, and a gutter-like portion 134. The peripheral wall 131 is provided along the left-right direction, and the peripheral wall 132 is provided along the front-rear direction. A right end of the peripheral wall 131 and a front end of the peripheral wall 132 are continuous to form an L shape. As shown in FIG. 4, a lower end of the peripheral wall 131 has a double wall structure including an outer wall portion 131A and an inner wall portion 131B that are separated in the front-rear direction. As shown in FIG. 5, a lower end of the peripheral wall 132 has a double wall structure including an outer wall portion 132A and an inner wall portion 132B that are separated in the front-rear direction.

As shown in FIG. 3, the block 133 is provided with an accommodating chamber for accommodating and holding a plurality of electronic components 20, similarly to the blocks 9 to 11 described above. The block 133 is integrally fixed and provided on inner sides of the peripheral walls 131, 132. The gutter-like portion 134 is provided so as to protrude downward from a corner portion where the peripheral wall 131 is continuous with the peripheral wall 132 and so as to make a recess face thereof face the inside of the electric junction box 1.

The cover 14 is to be attached to the lower side of the connector block 13. As shown in FIG. 3, the cover 14 includes peripheral walls 141 to 144 (first peripheral wall) formed in a substantially rectangular cylindrical shape, a bottom wall 145 (first bottom wall) covering lower openings of the peripheral walls 141 to 144, a drain hole 146 (first drain hole, FIG. 5) and a drain portion 147 (FIG. 5) provided in the bottom wall 145, and a gutter-like portion 148. The peripheral walls 142, 144 are provided along the front-rear direction, and the peripheral walls 141, 143 are provided along the left-right direction.

The peripheral walls 141 to 144 forms a rectangular cylindrical shape by connecting the peripheral wall 143 between rear ends of the peripheral wall 142, 144 and connecting the peripheral wall 141 between front ends of the peripheral wall 142, 144. The front end of the peripheral wall 142 and a right end of the peripheral wall 141 are provided apart from each other. When the cover 14 is assembled to the connector block 13, the peripheral walls 131 and 141 are on the same plane, and the peripheral walls 132 and 142 are on the same plane.

Figure 6:
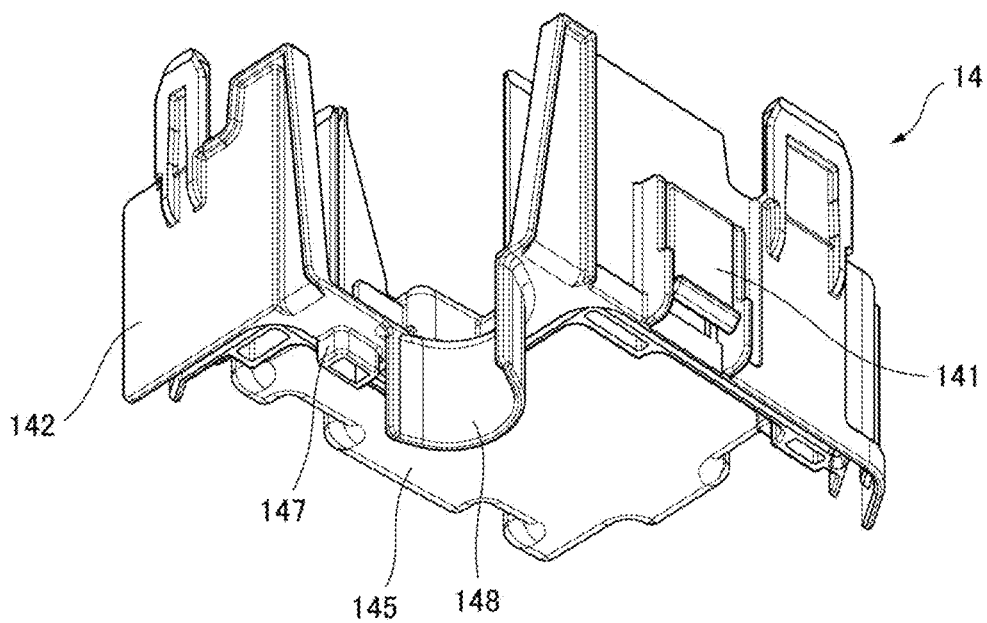
FIG. 6 is a perspective view of a cover shown in FIG. 3 as viewed from below.

The bottom wall 145 covers the lower openings of the peripheral walls 141 to 144 formed in a rectangular cylindrical shape. The drain hole 146 is provided in a rectangular shape at the right end of the bottom wall 145 and at the center in the front-rear direction. As shown in FIG. 5, the bottom wall 145 is provided to be a spherical face protruding downward, and the drain hole 146 is provided at the bottom position of the spherical face. As shown in FIG. 5 and FIG. 6, the drain portion 147 protrudes downward from an edge portion of the drain hole 146 in the bottom wall 145 and is formed in a substantially rectangular cylindrical shape.

A notch is provided at a corner portion at a right-front end of the bottom wall 145. The gutter-like portion 148 is provided so as to protrude downward from an edge portion of the notch, and so as to make a recess face thereof face the inside of the electric junction box 1. When the cover 14 is assembled to the connector block 13, the gutter-like portions 134 and 148 overlap each other in the left-right direction to form a cylindrical electric wire draw-out port 15.

As shown in FIG. 4, an upper end of the peripheral wall 141 has a double wall structure including an outer wall portion 141A and an inner wall portion 141B that are separated in the front-rear direction. When the cover 14 is assembled to the connector block 13, the inner wall portion 141B provided on the cover 14 is inserted between the outer wall portion 131A and the inner wall portion 131B provided on the connector block 13.

As shown in FIG. 5, an upper end of the peripheral wall 142 has a triple wall structure including an outer wall portion 142A, a middle wall portion 142B, and an inner wall portion 142C that are separated in the left-right direction. In the present embodiment, the upper end of the peripheral wall 142 is described to have a triple wall structure, but may also have a double wall structure. When the cover 14 is assembled to the connector block 13, the middle wall portion 142B provided on the cover 14 is inserted between the outer wall portion 132A and the inner wall portion 132B provided on the connector block 13.

In the present embodiment, as shown in FIG. 4, in order to prevent erroneous connection of the outer wall portion 141A provided on the cover 14 between the outer wall portion 131A and the inner wall portion 131B provided on the connector block 13, the following configuration is used. That is, a thickness D1 of at least a part of the outer wall portion 141A is provided to be larger than a distance L1 between the outer wall portion 131A and the inner wall portion 131B of the connector block 13. In the present embodiment, when a rib R1 protruding outward is provided on the upper end of the outer wall portion 141A, the thickness D1 of the outer wall portion 141A including the rib R1 is provided to be larger than the distance L1. Accordingly, the outer wall portion 141A cannot be inserted between the outer wall portion 131A and the inner wall portion 131B, and the erroneous connection can be prevented.

In addition, in the present embodiment, as shown in FIG. 5, in order to prevent erroneous connection of the outer wall portion 142A provided on the cover 14 between the outer wall portion 132A and the inner wall portion 132B provided on the connector block 13, the following configuration is used. That is, a thickness D2 of at least a part of the outer wall portion 142A is provided to be larger than a distance L2 between the outer wall portion 132A and the inner wall portion 132B of the connector block 13. In the present embodiment, when a rib R2 protruding outward is provided on the upper end of the outer wall portion 142A, the thickness D2 of the outer wall portion 142A including the rib R2 is provided to be larger than the distance L2. Accordingly, the outer wall portion 142A cannot be inserted between the outer wall portion 132A and the inner wall portion 132B, and the erroneous connection can be prevented.

In the present embodiment, the ribs R1, R2 are provided on the upper ends of the outer wall portions 141A, 142A to make the thicknesses D1, D2 greater than the distances L1, L2, but the present invention is not limited to this. The positions of the ribs R1, R2 are not limited to the upper ends, and the ribs R1, R2 may be provided in centers of the outer wall portions 141A, 142 in the up-down direction. Alternatively, the ribs R1, R2 may be not be provided, and the entire thickness of the outer wall portions 141A, 142A may be set to be larger than the distances L1, L2.

Figure 7:
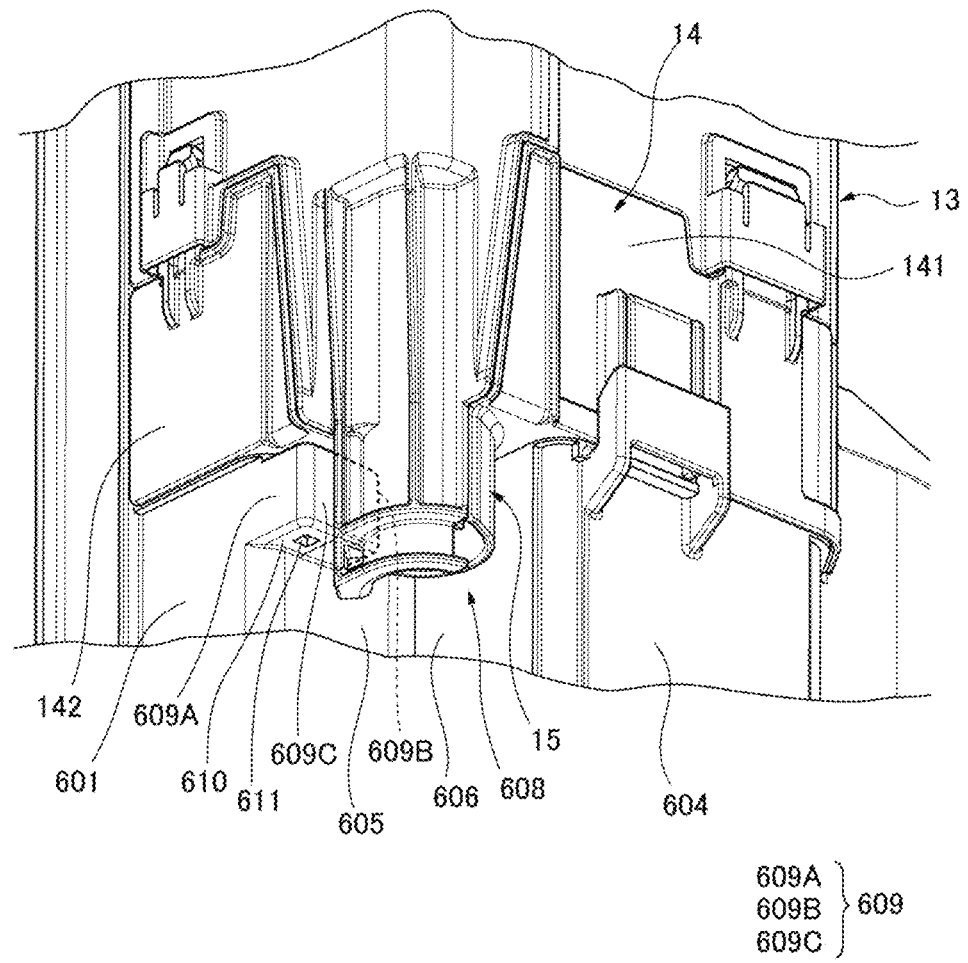
FIG. 7 is a partial perspective view of the electric junction box shown in FIG. 1.

When the above fitting component 12 is assembled to the housing body 6, as shown in FIG. 7, the drain portion 147 and the electric wire draw-out port 15 are positioned outside the recess portion 608. As shown in FIG. 1 and FIG. 7, the housing body 6 includes a surrounding wall 609 provided to protrude to an outer side of the peripheral wall 605, inserted with the drain portion 147 and surrounding the drain portion 147, a bottom wall 610 (second bottom wall) covering a lower opening of the surrounding wall 609, and a drain hole 611 (second drain hole) provided in the bottom wall 610.

The surrounding wall 609 includes a pair of wall portions 609A and 609B protruding forward from the peripheral wall 605, and a connection wall 609C connecting front ends of the pair of wall portions 609A and 609B. In the surrounding wall 609, a lower side thereof is covered by the bottom wall 610, and an upper side thereof is opened. When the drain portion 147 is inserted into the surrounding wall 609 through the upper opening, the surrounding wall 609 and the peripheral wall 605 surround an axis of the drain portion 147 in the up-down direction. The drain hole 146 and the drain hole 611 are not disposed side by side in the up-down direction (vertical direction), but are disposed at positions displaced from each other in a direction orthogonal to the up-down direction. In the present embodiment, the drain hole 146 and the drain hole 611 are disposed at positions displaced from each other in the left-right direction.

According to the embodiment described above, the bottom wall 145 of the fitting component 12 includes the drain hole 146 and the cylindrical drain portion 147 protruding downward from a peripheral edge of the drain hole 146. The drain portion 147 is inserted into the surrounding wall 609 that is provided to protrude to the outer side of the peripheral wall 605 of the housing body 6. Since the drain portion 147 is covered with the surrounding wall 609 and the bottom wall 610 covering the lower opening of the surrounding wall 609, it is possible to prevent water from entering the fitting component 12 through the drain hole 146 during high pressure washing or the like. In addition, the water drained from the drain hole 146 is drained to the outside through the drain portion 147 and the drain hole 611 provided in the bottom wall 610.

In addition, according to the embodiment described above, the drain hole 146 and the drain hole 611 are provided at positions displaced from each other in the left-right direction. Accordingly, it is possible to further prevent water from entering the fitting component 12 through the drain hole 146.

Further, according to the embodiment described above, the housing 2 is provided with the accommodating chamber for accommodating the block 11 and provided below a fitting and holding position of the fitting component 12, and the peripheral wall 605 forming the accommodating chamber is provided with the surrounding wall 609 and the bottom wall 610. Since the peripheral wall 605 faces the drain portion 147 of the fitting component 12, the surrounding wall 609 and the bottom wall 610 can be provided on the peripheral wall 605.

Further, according to the embodiment described above, the bottom wall 145 is provided to be the spherical face protruding downward, and the drain hole 146 is provided at the bottom position of the spherical face. Accordingly, the water that has entered the fitting component 12 can move toward the drain hole 146 through the bottom wall 145 by gravity and be drained from the drain hole 146.

Further, according to the embodiment described above, the lower ends of the peripheral walls 131, 132 of the connector block 13 are each provided in a double wall structure, and the upper ends of the peripheral walls 141, 142 of the cover 14 are respectively provided in a double wall structure and a triple wall structure. However, the present invention is not limited to this. The peripheral walls 131, 132, 141, 142 may each include one wall portion.

The present invention is not limited to the above-described embodiments, and can be modified, improved, and the like as appropriate. In addition, the material, shape, dimension, number, arrangement position, or the like of each component in the above embodiment are optional and are not limited as long as the present invention can be achieved.

According to the embodiment described above, the drain hole 146 and the drain hole 611 are provided at positions displaced from each other in the left-right direction, but it is not essential. If the drain portion 147 is surrounded by the surrounding wall 609, water can be prevented from entering from a horizontal direction during high pressure washing, and the drain hole 146 and the drain hole 611 may face each other in the up-down direction. In addition, if the drain hole 146 and the drain hole 611 are positioned to be displaced from each other in the left-right direction, a part of the drain hole 146 and a part of the drain hole 611 may face each other in the up-down direction.

In addition, according to the embodiment described above, the block 11 holding the electronic component 20 is accommodated below the fitting component 12, and the peripheral wall 605 forming the accommodating chamber for accommodating the block 11 is provided with the surrounding wall 609 and the bottom wall 610. However, the present invention is not limited thereto. The block 11 may not be accommodated below the fitting component 12.

Further, according to the embodiment described above, the bottom wall 145 is provided in a spherical shape, but the present invention is not limited thereto. The bottom wall 145 may not be provided in a spherical shape.

Further, according to the embodiment described above, the fitting component 12 includes two components, the connector block 13 and the cover 14, but the present invention is not limited thereto. The fitting component 12 may include one component.

Here, characteristics of the embodiment of the electric junction box according to the present invention described above are summarized briefly in the following [1] to [4].

[1] An electric junction box (1) comprising:
a fitting component (12) to which an electronic component (20) and an electric wire (30) electrically connected to the electronic component (20) are assembled; and
a housing (2) in which the fitting component (12) is fitted and held,
wherein the fitting component (12) includes:
a first peripheral wall (131, 132, 141 to 144) forming an outer side face of the fitting component (12);
a first bottom wall (145) covering a lower opening of the first peripheral wall (131, 132, 141 to 144);
a first drain hole (146) provided in the first bottom wall (131, 132, 141 to 144); and
a cylindrical drain portion (147) protruding downward from an edge portion of the first drain hole (146) in the first bottom wall (131, 132, 141 to 144), and
wherein the housing (2) includes:
a second peripheral wall (601 to 606) forming an outer side face of the housing (2);
a surrounding wall (609) provided to protrude to an outer side of the second peripheral wall (601 to 606), inserted with the drain portion (147), and surrounding the drain portion (147);
a second bottom wall (610) covering a lower side of the surrounding wall (609); and
a second drain hole (611) provided in the second bottom wall (610).

[2] The electric junction box (1) according to [1], wherein the first drain hole (146) and the second drain hole (611) are provided at positions displaced from each other in a direction orthogonal to a vertical direction.

[3] The electric junction box (1) according to [1] or [2], wherein the housing (2) has an accommodating chamber provided below a fitting and holding position of the fitting component (12) and accommodating the electronic component (20), and
wherein the surrounding wall (609) and the second bottom wall (610) are provided on a portion of the second peripheral wall (601 to 606) forming the accommodating chamber.

[4] The electric junction box (1) according to any one of [1] to [3],
wherein the first bottom wall (145) is provided to be a spherical face protruding downward, and
wherein the first drain hole (146) is provided at a bottom position of the spherical face.

According to the aspect [1], the drain portion is inserted into the surrounding wall that is provided to protrude to the outer side of the second peripheral wall of the housing. Since the drain portion is covered with the surrounding wall and the second bottom wall, it is possible to prevent water from entering the fitting component through the first drain hole. In addition, the water drained from the first drain hole is drained to the outside through the drain portion and the second drain hole provided in the second bottom wall.

According to the aspect [2], the first drain hole and the second drain hole are provided at the positions displaced from each other in the direction orthogonal to the vertical direction. Accordingly, it is possible to further prevent the water from entering the fitting component through the first drain hole.

According to the aspect [3], the portion of the second peripheral wall forming the accommodating chamber faces the drain portion of the fitting component, so that the surrounding wall and the bottom wall can be provided on this portion.

According to the aspect [4], the first bottom wall is provided to be the spherical face protruding downward, and the first drain hole is provided at the bottom position of the spherical face. Accordingly, the water that has entered the fitting component can move toward the first drain hole through the first bottom wall by gravity and be drained from the first drain hole.

According to one or more embodiments, it is possible to provide an electric junction box capable of preventing water from entering the fitting component through the first drain hole since the drain portion is covered with the surrounding wall and the second bottom wall.

What is claimed is:

1. An electric junction box comprising:
    a fitting component to which an electronic component and an electric wire electrically connected to the electronic component are assembled; and
    a housing in which the fitting component is fitted and held,
    wherein the fitting component includes:
        a first peripheral wall forming an outer side face of the fitting component;
        a first bottom wall covering a lower opening of the first peripheral wall;
        a first drain hole provided in the first bottom wall; and
        a cylindrical drain portion protruding downward from an edge portion of the first drain hole in the first bottom wall, and
    wherein the housing includes:
        a second peripheral wall forming an outer side face of the housing;
        a surrounding wall provided to protrude to an outer side of the second peripheral wall, inserted with the drain portion, and surrounding the drain portion;
        a second bottom wall covering a lower side of the surrounding wall; and
        a second drain hole provided in the second bottom wall.

2. The electric junction box according to claim 1, wherein the first drain hole and the second drain hole are provided at positions displaced from each other in a direction orthogonal to a vertical direction.

3. The electric junction box according to claim 1, wherein the housing has an accommodating chamber provided below a fitting and holding position of the fitting component and accommodating the electronic component, and
    wherein the surrounding wall and the second bottom wall are provided on a portion of the second peripheral wall forming the accommodating chamber.

4. The electric junction box according to claim 1, wherein the first bottom wall is provided to be a spherical face protruding downward, and
    wherein the first drain hole is provided at a bottom position of the spherical face.

* * * * *